(12) United States Patent
Butler

(10) Patent No.: US 8,181,671 B2
(45) Date of Patent: May 22, 2012

(54) ANTI-RESONANT PULSE DIFFUSER

(76) Inventor: Boyd L. Butler, Sandy, UT (US)

( * ) Notice: Subject to any disclaimer, the term of this patent is extended or adjusted under 35 U.S.C. 154(b) by 338 days.

(21) Appl. No.: 12/560,219

(22) Filed: Sep. 15, 2009

(65) Prior Publication Data

US 2011/0061757 A1 Mar. 17, 2011

(51) Int. Cl.
*F15D 1/04* (2006.01)

(52) U.S. Cl. .............. 138/39; 138/37; 138/42; 181/270; 181/258

(58) Field of Classification Search .............. 138/37, 138/39; 181/270, 272, 275, 258; 60/299
See application file for complete search history.

(56) References Cited

U.S. PATENT DOCUMENTS

| | | | |
|---|---|---|---|
| 2,557,687 A | 6/1951 | Rainville | 181/282 |
| 3,149,925 A * | 9/1964 | Scheitlin | 422/176 |
| 3,169,836 A * | 2/1965 | Davis | 422/171 |
| 3,185,252 A | 5/1965 | Lemmerman | 181/217 |
| 3,219,142 A | 11/1965 | Deremer | 181/227 |
| 3,292,731 A | 12/1966 | Ballard | 181/227 |
| 3,958,950 A | 5/1976 | DePalma | 422/177 |
| 4,094,644 A | 6/1978 | Wagner | 422/181 |
| 4,133,479 A | 1/1979 | Musitano et al. | 237/12.3 A |
| 4,305,477 A | 12/1981 | Moore | 181/249 |
| 5,123,501 A | 6/1992 | Rothman et al. | 181/239 |
| 5,171,944 A | 12/1992 | Aridome et al. | 181/233 |
| 5,183,976 A | 2/1993 | Plemons, Jr. | 181/264 |
| 5,304,749 A * | 4/1994 | Crandell | 181/264 |
| 5,378,435 A | 1/1995 | Gavoni | 422/177 |
| 5,844,178 A | 12/1998 | Lothringen | 181/269 |
| 6,286,623 B1 * | 9/2001 | Shaya | 181/264 |
| 6,364,054 B1 | 4/2002 | Bubulka et al. | 181/264 |
| 6,539,702 B2 | 4/2003 | Nishimura et al. | 60/395 |
| 6,579,071 B1 | 6/2003 | Tarutani et al. | 417/269 |
| 6,609,590 B2 | 8/2003 | Zelinski | 181/281 |
| 6,651,773 B1 * | 11/2003 | Marocco | 181/270 |
| 7,093,688 B2 | 8/2006 | Lee | 181/155 |
| 7,104,359 B1 | 9/2006 | Zelinski | 181/264 |
| 7,281,606 B2 * | 10/2007 | Marocco | 181/270 |
| 7,549,511 B2 * | 6/2009 | Marocco | 181/270 |
| 7,905,322 B2 * | 3/2011 | Woods et al. | 181/264 |
| 2002/0104708 A1 | 8/2002 | Zelinski | 181/281 |
| 2010/0154396 A1 * | 6/2010 | Hahnl et al. | 60/320 |

* cited by examiner

*Primary Examiner* — Patrick F Brinson
(74) *Attorney, Agent, or Firm* — Thorpe North & Western LLP

(57) ABSTRACT

An elongate flow tube having an interior cross-section surrounding a long axis, an inlet end for receiving a fluid flow and an outlet end for discharging the fluid flow, and a diffuser plate spanning the interior cross-section to separate the flow tube into an inlet chamber and an outlet chamber. The diffuser plate includes a plurality of apertures formed therein for directing the fluid flow from the inlet chamber to the outlet chamber. Furthermore, the diffuser plate is orientated longitudinally at a shallow angle with respect to the long axis of the flow tube to provide an indeterminate pulsation reflective surface, with the inlet chamber gradually decreasing in cross-sectional area and the outlet chamber gradually increasing in cross-sectional area across the length of the flow tube.

22 Claims, 7 Drawing Sheets

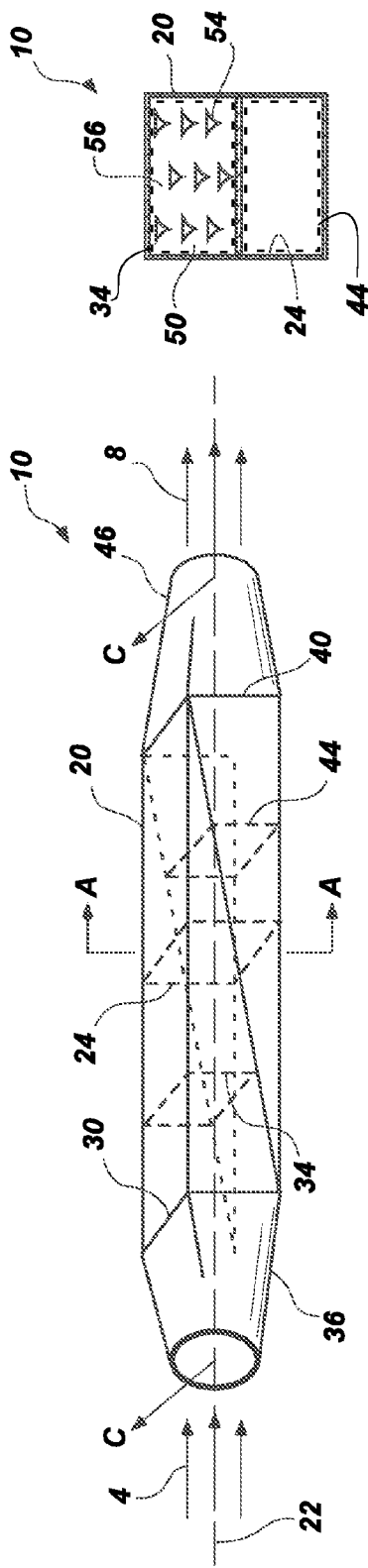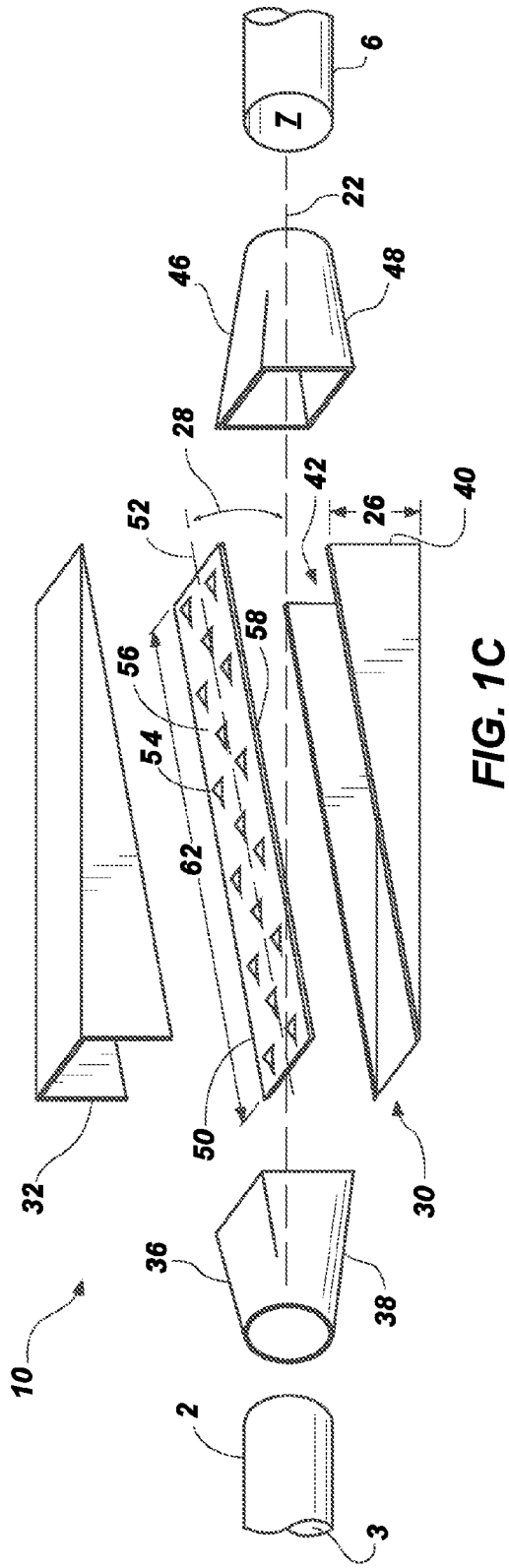

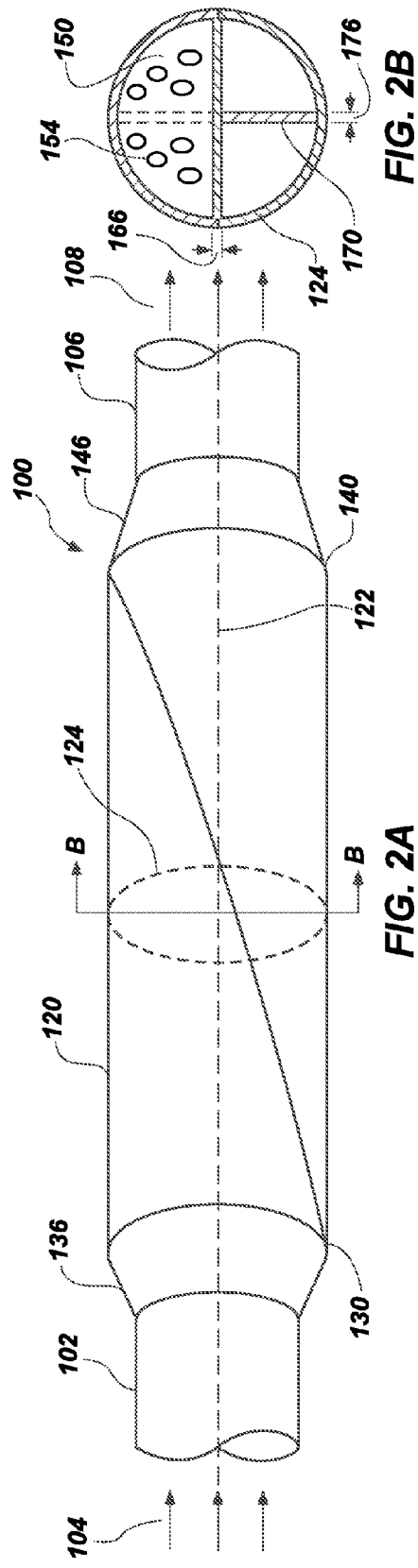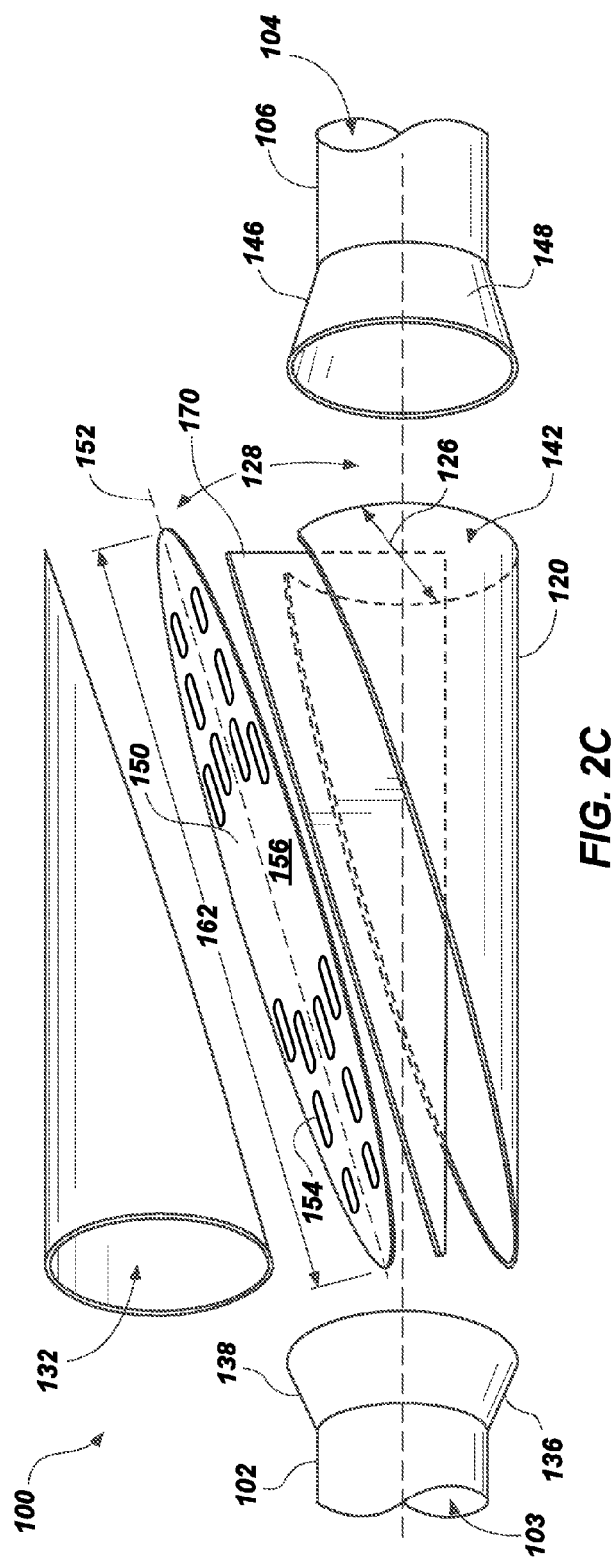

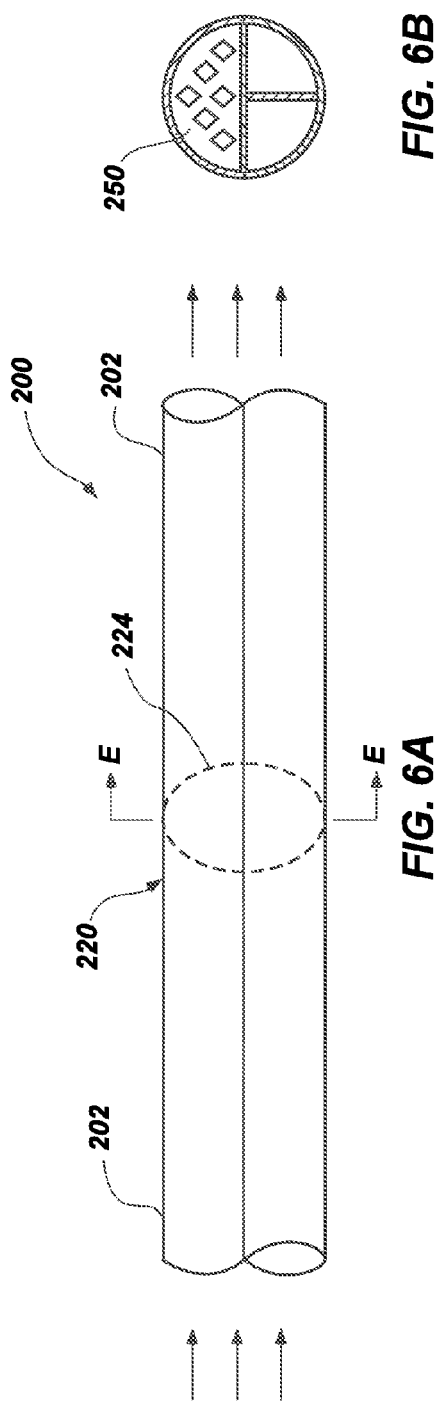

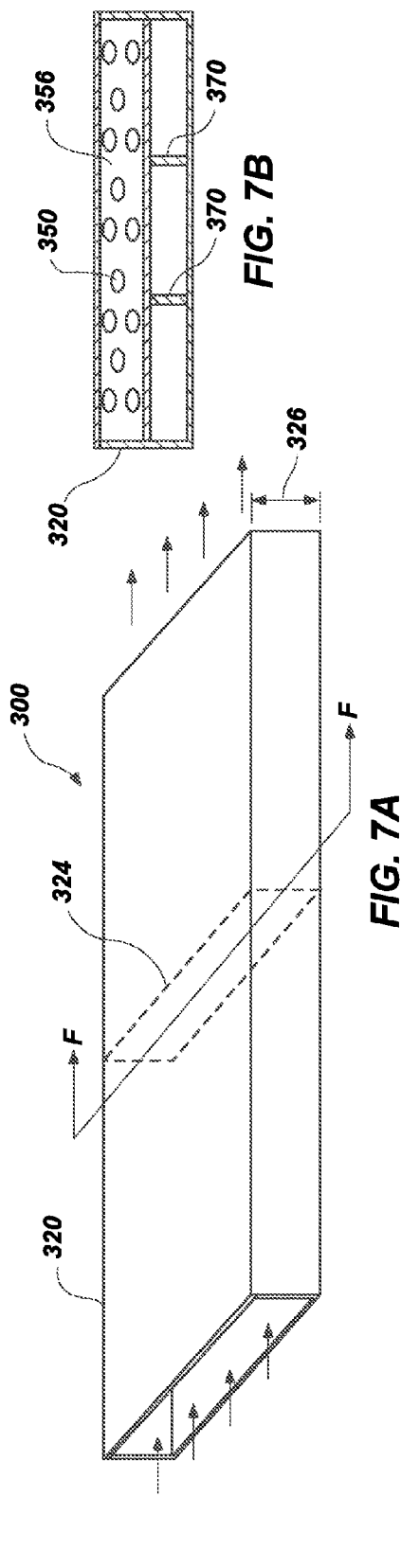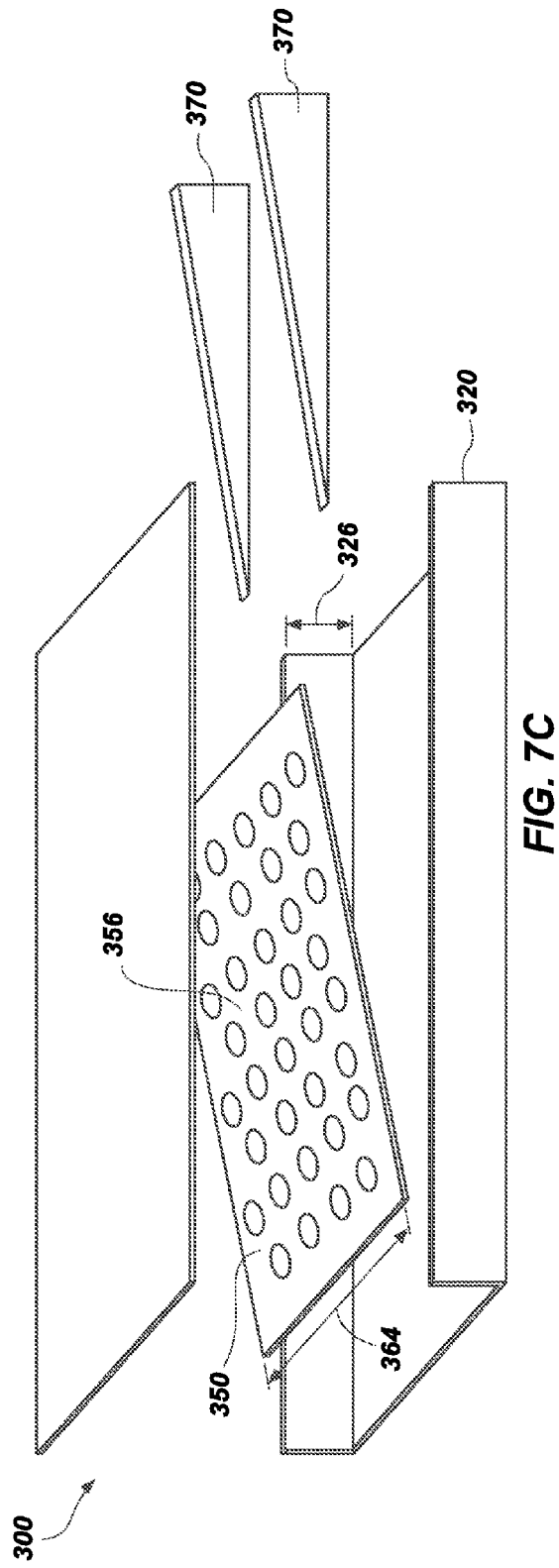

ANTI-RESONANT PULSE DIFFUSER

FIELD OF THE INVENTION

The present invention relates generally to apparatuses for reducing noise and vibration in piping systems, and more specifically to apparatuses for diffusing standing wave resonances in enclosed piping and exhaust systems.

BACKGROUND

Enclosed piping and exhaust systems that convey fluids at pressure are subject to standing wave resonances or resonant pulsations which can damage or destroy the various components of the piping system if allowed to continue unchecked. The standing wave resonances are typically comprised of pulsation waves or pulses traveling back and forth through a section of the piping system at a velocity or "speed of sound" which can be many times greater than the speed of the flowing fluid. The speed of sound through a fluid medium is proportional to the stiffness of the fluid divided by its density, and in a gas is highly dependent upon temperature. If an effective length of the piping system matches an integer or harmonic multiple of the wavelength of a particular acoustical frequency, and if a source of pressure pulsations provides a pressure pulse at that particular frequency, a self-reinforcing standing wave resonance can develop which can destroy or seriously damage the piping system and associated equipment. If the fluid is an incompressible liquid such as water, the resonant pulsations can create an effect similar to "hydraulic hammer". If the fluid is a gas, the pulsations can be known as an "acoustic" or "standing-wave" resonance or high-energy infinite wave.

Great efforts are often expended to eliminate hydraulic hammer and acoustic resonances from enclosed and pressurized piping and exhaust systems. These efforts can include tuning the piping system away from any harmonic alignment with a pulsation source, such as an engine, compressor, pump, flow valve or other source of disturbance, etc., or adding pulsation dampeners, silencers, accumulators or similar pulsation suppression device to the piping system. If conditions change, however, such as temperature of the gas or the excitation frequency from the pulsation source, a standing wave resonance may still begin to build up in one or more segments of the piping system.

SUMMARY

In accordance with a representative embodiment of the present invention as broadly described herein, an Anti-Resonant Pulse Diffuser comprises an elongate flow tube having an interior cross-section surrounding a long axis, an inlet end for receiving a fluid flow and an outlet end for discharging the fluid flow, and a diffuser plate spanning the interior cross-section to separate the flow tube into an inlet chamber and an outlet chamber. The diffuser plate includes a plurality of apertures formed therein for directing the fluid flow from the inlet chamber to the outlet chamber. Furthermore, the diffuser plate is orientated longitudinally at a shallow angle with respect to the long axis of the flow tube to provide an indeterminate pulsation reflective surface, with the inlet chamber gradually decreasing in cross-sectional area and the outlet chamber gradually increasing in cross-sectional area across the length of the flow tube.

In accordance with another representative embodiment, the present invention further comprises a method for diffusing the intensity of pulsation waves in a piping system. The method includes obtaining a flow tube having an inlet end, an outlet end, and a diffuser plate spanning an interior cross-section of the flow tube at a shallow angle with respect to a long axis of the flow tube. The method also includes installing the flow tube into a piping system containing pulsation waves traveling therein, and directing the pulsation waves across a plurality of apertures formed in the diffuser plate. The method further includes using a surface of the diffuser plate as an indeterminate pulsation reflector to diffuse the intensity of the pulsation waves passing through the fluid.

BRIEF DESCRIPTION OF THE DRAWINGS

Features and advantages of the present invention will be apparent from the detailed description that follows, and when taken in conjunction with the accompanying drawings together illustrate, by way of example, features of the invention. It will be readily appreciated that these drawings merely depict representative embodiments of the present invention and are not to be considered limiting of its scope, and that the components of the invention, as generally described and illustrated in the figures herein, could be arranged and designed in a variety of different configurations. Nonetheless, the present invention will be described and explained with additional specificity and detail through the use of the accompanying drawings, in which:

FIGS. 1A-1C together illustrate perspective, cross-sectional and exploded assembly views of an anti-resonant pulse diffuser, in accordance with a representative embodiment of the present invention;

FIGS. 2A-2C together illustrate perspective, cross-sectional and exploded assembly views of an anti-resonant pulse diffuser, in accordance with another representative embodiment of the present invention;

FIGS. 6A-6C together illustrate perspective, cross-sectional and exploded assembly views of an anti-resonant pulse diffuser, in accordance with yet another representative embodiment of the present invention;

FIGS. 7A-7C together illustrate perspective, cross-sectional and exploded assembly views of an anti-resonant pulse diffuser, in accordance with yet another representative embodiment of the present invention.

DETAILED DESCRIPTION OF EXEMPLARY EMBODIMENTS

Figure 3A:
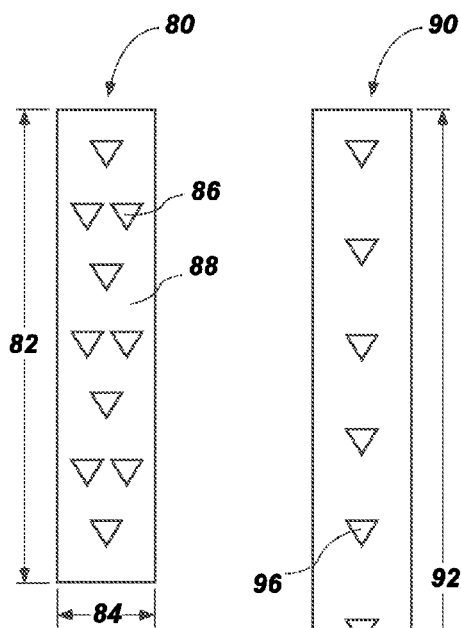
FIGS. 3A and 3B together illustrate plan views of two representative diffuser plates spanning the interior cross-section of the embodiment of FIG. 1A.

The following detailed description makes reference to the accompanying drawings, which form a part thereof and in which are shown, by way of illustration, various representative embodiments in which the invention can be practiced. While these embodiments are described in sufficient detail to enable those skilled in the art to practice the invention, it should be understood that other embodiments can be realized and that various changes can be made without departing from the spirit and scope of the present invention. As such, the following detailed description is not intended to limit the scope of the invention as it is claimed, but rather is presented for purposes of illustration, to describe the features and characteristics of the representative embodiments, and to sufficiently enable one skilled in the art to practice the invention. Accordingly, the scope of the present invention is to be defined solely by the appended claims.

Furthermore, the following detailed description and representative embodiments of the invention will best be understood with reference to the accompanying drawings, wherein the elements and features of the embodiments are designated by numerals throughout.

Illustrated in FIGS. 1-8 are several representative embodiments of an Anti-Resonant Pulse Diffuser, which embodiments also include various methods for using the apparatus for diffusing the intensity of pulsation waves in a pressurized piping system. As described below, the anti-resonant pulse diffuser provides several significant advantages and benefits over prior devices and methods for diffusing pulsation waves in a pressurized piping system. However, the recited advantages are not meant to be limiting in any way, as one skilled in the art will appreciate that other advantages may also be realized upon practicing the present invention.

FIGS. 1A-1C together illustrate a perspective view, a cross-sectional view taken along section line A-A, and an exploded assembly view of an anti-resonant pulse diffuser 10, in accordance with a representative embodiment of the present invention. The pulse diffuser can include an elongate flow tube 20 having an interior cross-section 24 surrounding a long axis 22. The flow tube can have an inlet end 30 for receiving a fluid flow 4, and an outlet end 40 for discharging the fluid flow 8. The pulse diffuser can further include an inlet transition piece 36 which can couple the inlet 30 of the flow tube to an upstream piping system 2, as well as an outlet transition piece 46 which can couple the outlet 40 of the flow tube to a downstream piping system 6.

In the embodiment 10 shown in FIGS. 1A-1C, the interior cross-section 24 of the pulse diffuser 10 can have a square or rectangular shape with a cross-sectional area that is larger than the cross-sectional area 3 of the inlet piping 2, so that the velocity of the fluid flow through the flow tube 20 can be slower than the velocity of the fluid flow 4, 8 through either of the upstream piping 2 or the downstream piping 6. This can be desirable in some circumstances, as a slower-moving fluid is less likely to suffer pressure head losses while passing through the pulsation diffuser than a faster-moving fluid. Alternatively, it may also be desirable on occasion to increase the velocity of the fluid transitioning the pulse diffuser, in which case the cross-sectional area 24 of the elongated flow tube 20 can be reduced relative to the cross-sectional areas 3, 7 of the upstream or downstream piping 2, 6. Both the inlet 36 and outlet 46 transition pieces can be formed with tapered sections 38, 48 that smoothly direct the fluid flow from a pipe with a smaller cross-sectional area to a tube with a larger cross-sectional area, or vice versa, as well as accommodate the differences in shape between pipes 2, 6 having a round cross-sectional shape, to a flow tube 20 having a square or rectangular cross-sectional shape 24.

The pulse diffuser 10 includes a diffuser plate 50 located inside the flow tube 20 and which spans the interior cross-section 24 to separate the flow tube into an inlet chamber 32 and an outlet chamber 42. The diffuser plate includes a plurality of apertures 54 formed therein for directing the fluid flow from the inlet chamber to the outlet chamber. The long axis 52 of the diffuser plate 50 is longitudinally orientated at a shallow angle 28 with respect to the long axis 22 of the flow tube 20, to provide an indeterminate pulsation reflective surface or reflector 56. To produce the shallow angle between the long axis 52 of the diffuser plate and the long axis 22 of the flow tube, the length 62 of the diffuser plate is substantially greater than the height 26 of the flow tube, as much as five to ten times greater in a preferred embodiment, to provide a shallow angle 28 that is about twelve degrees to about five degrees with respect to the long axis 22 of the flow tube 20. In another aspect, the length 62 of the diffuser plate can be about three times the height 26 of the flow tube or more, resulting in a shallow angle between the long axis 52 of the diffuser plate and the long axis 22 of the flow tube that is less than or about twenty degrees.

Orientating the diffuser plate 50 at a shallow angle 28 with respect to the long axis of the flow tube 20 can cause the inlet chamber 32 upstream of the diffuser plate and in fluid communication with flow tube's inlet 30 to have a gradually decreasing cross-sectional area 34 in the direction of flow. This also can create the opposite arrangement with the outlet chamber 42 downstream of the diffuser plate and in fluid communication with the flow tube's outlet 40, causing it to have a gradually increasing cross-sectional area 44 in the direction of flow. Moreover, positioning the diffuser plate 50 at a shallow angle creates an indeterminate pulsation reflective surface 56 against which pulsation waves traveling through the piping system cannot find purchase for a complete reflection, and instead the resonant or standing pulsation waves are broken up, diffused, and/or absorbed through the apertures 54 in the diffuser plate or partially reflected forward into the decreasing wedge of the inlet chamber 34 for entrapment and further dissipation.

Unlike other noise attenuators and pulsation inhibitors found in the prior art, which use friction or energy loss dissipation through an orifice or aperture to dampen a standing acoustic wave, the pulse diffuser 10 of the present invention can function with little to minimal pressure or head loss to the fluid flow traversing the apparatus. This is a result of the pulse diffuser's ability to break up and attenuate or absorb any resonant or standing pulsation waves that attempt to form in the piping system using the indeterminate reflector surface 56 of the diffuser plate 50, as described above. Consequently, it can be desirable to maintain the total or combined cross-sectional area of the apertures 54 to be substantially equal to or greater than the cross-sectional area 24 of the flow tube 20, or substantially equal to or greater than the cross-sectional area 3 of the upstream piping 2, so that there is a minimal pressure loss as the fluid flow passes through the apertures. Furthermore, the edges of the apertures can be modified, such as being rounded, smoothed or curved, to further reduce any friction as the fluid flow passes through the diffuser plate from the inlet chamber 32 to the outlet chamber 42.

The edges or perimeter 58 of the diffuser plate 50 can seal against the inside surfaces of the flow tube so that all of the fluid flow is directed through the apertures 54. In one aspect edges of the diffuser plate can be welded to the sides, bottom and top of the rectangular flow tube 20 to form a rigid and stiff configuration. Other systems and methods of coupling the diffuser plate 50 to the flow tube 20, such as fastening hardware or adhesives, are possible. Moreover, the body of the flow tube 20 being separated into upper and lower halves with an angled split-line coincident with the edges of the diffuser plate, as shown in FIGS. 1A and 1C, is just one representative embodiment for configuring the flow tube and assembling the diffuser plate and flow tube together. Other arrangements and methods for forming the flow tube and assembling the diffuser plate into the flow tube, such as a box-shape flow tube with a removable lid for insertion of the diffuser plate, are also possible and considered to fall within the scope of the present invention.

The apertures 54 formed into the diffuser plate 50 can be provided in a wide selection of shapes. As shown in the embodiment 10 illustrated in FIGS. 1A-1C, for instance, the apertures 54 can have a NACA duct opening shape, which is a generally triangular shape have its apex pointed against the direction of flow and with curved sides configured to create opposing vortexes which help to direct the flow through the aperture. Other shapes for the apertures can include triangular, square, rectangular, diamond, polygonal, round, slotted, slotted with rounded ends, oblong, hemispherical and pie opening shapes, etc., and combinations thereof, several of which are illustrated in additional embodiments of the pulse diffuser described below.

Illustrated in FIGS. 2A-2C is another representative embodiment of the present invention, in which the interior cross-section of the flow tube 120 can have a round cross-sectional shape 124 surrounding a long axis 122 to form a round pulse diffuser 100. The flow tube can have an inlet end 130 for receiving a fluid flow 104, and an outlet end 140 for discharging the fluid flow 108. The pulse diffuser can also include an inlet transition piece 136 which can be coupled to the inlet 130 of the flow tube to the upstream piping system 102, as well as an outlet transition piece 146 which can couple the outlet 140 of the flow tube to a downstream piping system 106.

Similar to the embodiment with a square or rectangular interior cross-section described above, in one aspect the round pulse diffuser 100 of FIGS. 2A-2C can have a round interior cross-sectional area 124 that is larger than the cross-sectional area 103 of the inlet piping 102, so that the velocity of the fluid flow through the flow tube 120 can be slower than the velocity of the fluid flow 104, 108 through either of the upstream piping 102 or the downstream piping 106. Alternatively, the cross-sectional area of the flow through tube 120 can be smaller than the cross-sectional area of the inlet and outlet piping to provide increased flow velocity through the flow tube. In both situations the inlet 136 and outlet 146 transition pieces can be formed with tapered sections 138, 148 that smoothly direct the flow from a pipe with a smaller cross-sectional area to a tube with a larger cross-sectional area, or vice versa.

The round pulse diffuser 100 includes an elliptical diffuser plate 150 located inside the round flow tube 120 and which spans the interior cross-section 124 to separate the flow tube into an inlet chamber 132 and an outlet chamber 142. The long axis 152 of the elliptical diffuser plate 150 can be longitudinally orientated at a shallow angle 128 with respect to the long axis 122 of the flow tube 120 to provide an indeterminate pulsation reflective surface or reflector 156 having the same affect on standing pulsation waves as the rectangular embodiment described above. To produce the shallow angle between the long axis 152 of the diffuser plate and the long axis 122 of the flow tube, the length 162 of the diffuser plate is substantially greater than the diameter 126 of the flow tube, as much as five to ten times greater in a preferred embodiment, to provide a shallow angle 128 that is about twelve degrees to about five degrees with respect to the long axis 122 of the flow tube 120. In another aspect, the length 162 of the diffuser plate can be about three times the diameter 126 of the flow tube or more, resulting in a shallow angle 128 between the long axis 152 of the diffuser plate and the long axis 122 of the flow tube that is less than or about twenty degrees.

The elliptical diffuser plate 150 spanning the interior cross-section 124 of the flow tube 120 can also have a plurality of apertures 154 formed therein for directing the fluid flow 104 from the inlet chamber 132 to the outlet chamber 142. The apertures can have various shapes, and as shown in the embodiment of FIGS. 2B and 2C, the apertures can have a slotted shape with rounded ends when viewed from above, or a shortened slotted shape when viewed from the inlet 130 or outlet 140 of the flow tube. The slotted shape can have a length-to-width aspect ratio of 3:1 or more.

Also shown in FIGS. 2B and 2C is an optional diffuser plate support 170 (or supports) that can be used to further maintain the diffuser plate 150 in its position inside the flow tube 120, and to prevent the diffuser plate from bending or flexing in response to the inlet fluid flow 104 impinging on its front surface 156. It is to be appreciated that a diffuser plate support can also be included with the pulse diffuser having the square or rectangular cross-section described above. Both the diffuser plate 150 and the diffuser plate support can have a thickness 166, 176, respectively, that imparts the components with sufficient structural support to withstand the steady-state forces resulting from the impinging incoming flow, as well as the high-level cyclic forces imparted by pulsation waves traveling through the piping system. Both the diffuser plate 150 and the diffuser plate support 170 can also be made from a material or provided with a protective coating that inhibits the wear and corrosion of the exposed surfaces in response to contact with the fluid flow, especially the exposed edges of the apertures 154 that are subject to the highest velocity flows.

Additional representative embodiments of the diffuser plate are illustrated in FIGS. 3A-3B and 4A-4B. In a square flow tube in which the width of the diffuser plate is equal to the height of the flow tube, the diffuser plate 80 shown in FIG. 3A has a length 82 that is about five times as long as its width 84 (or height of the flow tube). When installed in a square flow tube of constant cross-section, the diffuser plate can be orientated at an angle of about twelve degrees with respect to the fluid flow and long axis of the flow tube. A similar orientation is achieved with elliptical diffuser plate 180 (FIG. 4A), installed in round flow tube of constant cross-section and having a length 182 that is about five times its maximum width 184 (or diameter of the flow tube), also resulting in the twelve degree orientation.

Figure 3B:
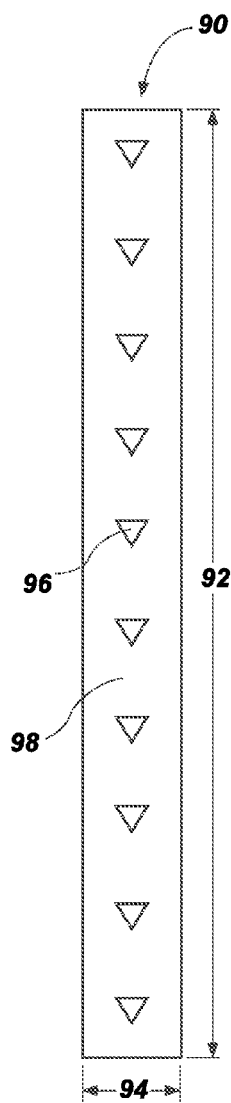
Figure 4A:
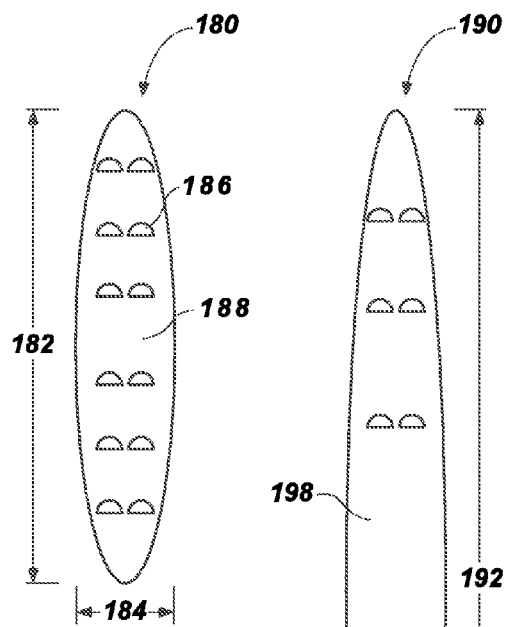
FIGS. 4A and 4B together illustrate plan views of two representative diffuser plates spanning the interior cross-section of the embodiment of FIG. 2A.
Figure 4B:
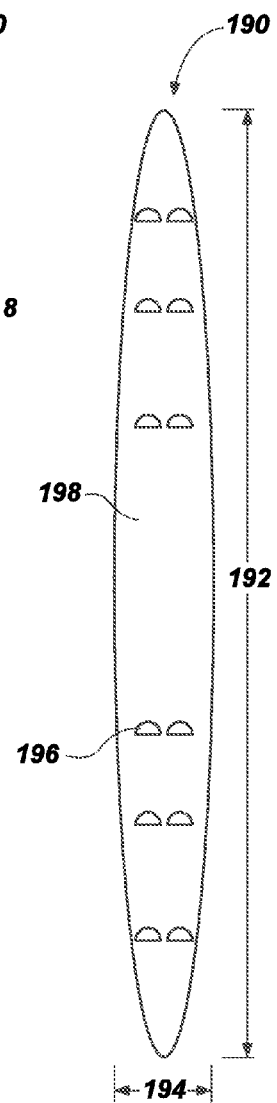

Referring now to FIGS. 3B and 4B, the diffuser plates 90, 190 can each have a length 92, 192, respectively, that is about ten time as long as its width 94, 194. When installed in a square or round flow tube of constant cross-section, the diffuser plates can be orientated at angles of about five degrees with respect to the overall fluid flow and long axis of the flow tube.

As can also be seen, the rectangular diffuser plates 80, 90 illustrated in FIGS. 3A-3B can have triangular apertures 86, 96 that are formed in a regular repeating pattern across the surfaces 88, 98 of the diffusers plates. In contrast, the elliptical diffuser plates 180, 190 illustrated in FIGS. 4A-4B can have hemispherical apertures 186, 196 that are organized into two groupings located at either end of the surfaces 188, 198 of the diffuser plates. Thus, it is to be recognized that the placement and grouping of the apertures across the surfaces of the diffuser plate, as well as their shapes, sizes and numbering, can also vary considerably within the various embodiments of the present invention.

Figure 5A:
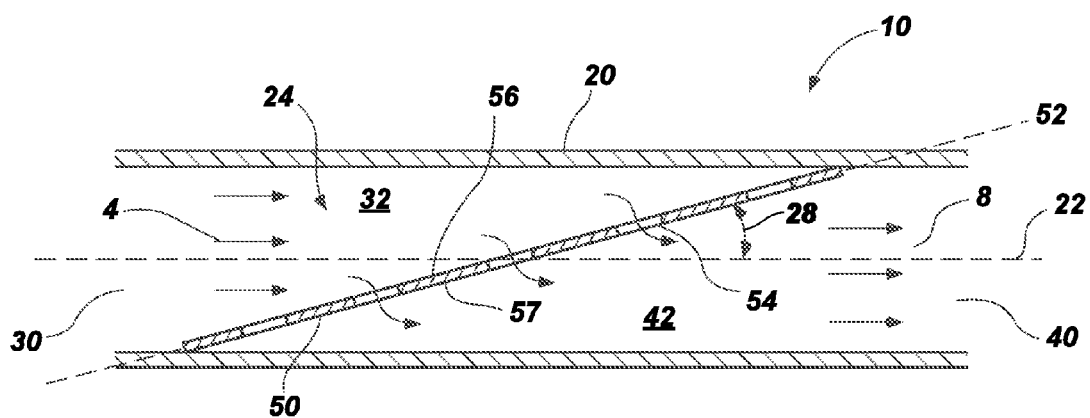
FIGS. 5A-5C together illustrate cross-sectional side views of three representative diffuser plates spanning the interior cross-section of the embodiment of FIG. 1A, as viewed from section line C-C.
Figure 5B:
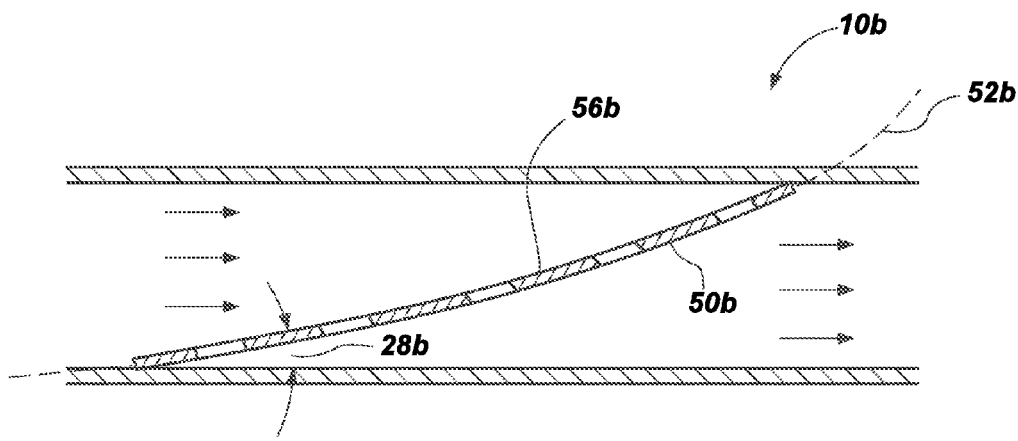
Figure 5C:
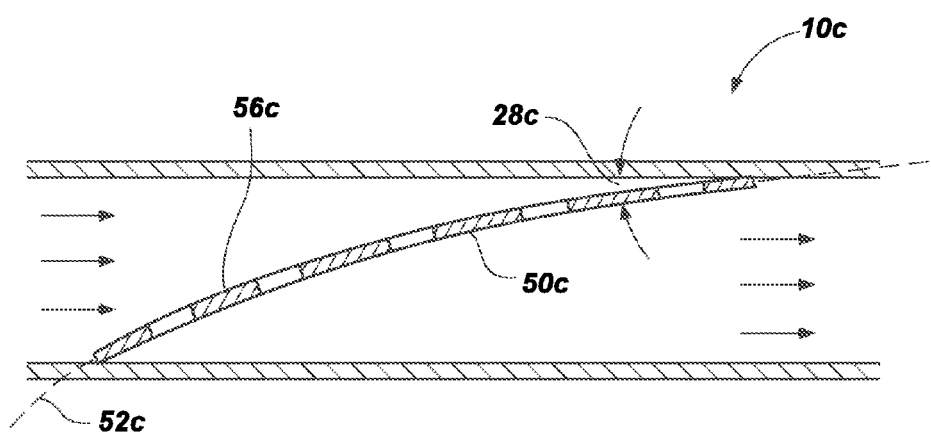

Illustrated in FIGS. 5A-5C are cross-sectional views taken along section line C-C of FIG. 1A that is coincident with the long axis 22 of the pulse diffuser 10 of FIG. 1A, showing three representative diffuser plates located in the interior cross-section 24 of the flow tube 20. Diffuser plate 50 shown in FIG. 5A can have a long axis 52 that is straight along the length thereof, and which is orientated at angle 28 to span the interior passage of the flow tube 20 to separate the flow tube into an inlet chamber 32 and an outlet chamber 42. As can further be seen, the inlet flow 4 can enter the inlet chamber, turn at a sharp angle to pass through apertures 54, and then turn back in the opposite direction to exit the outlet chamber as the outlet flow 8. Due to the separated nature of the multiple apertures 54, however, the energy pulsation waves traveling through the piping system cannot pass through the separated apertures in a coherent fashion, but instead pass through the apertures in an incoherent fashion which causes the multiple wave segments to diffuse and cross-cancel, and thereby preventing the pulsation waves from traveling further downstream from the pulse diffuser. Thus, the pulse diffuser can isolate the downstream piping from the upstream pulsation source.

While the fluid flowing through the pulse diffuser can continuously pass from the inlet to the outlet, pulsation waves can travel through the fluid medium in either direction and at much greater velocity than the speed of the fluid flow. However, the symmetrical nature of the pulse diffuser 10 can allow the device to operate equally well with pulsation waves coming from both directions, and therefore can also operate to diffuse pulsation waves introduced in the downstream piping and which enter the flow tube 20 from the outlet 40. Thus, the diagonal orientation of the diffuser plate 50 in the flow tube and the multiplicity of the apertures 54 can operate to diffuse and isolate any resonant or standing pulsation waves that attempt to form in either the upstream or downstream piping systems, using the indeterminate front surface reflector 56 to control upstream pulsation waves and the indeterminate back surface or reflector 57 to control downstream pulsation waves.

In another representative embodiment 10b illustrated in FIG. 5B, the long axis 52b of the diffuser plate 50b can have a continuous concave curve along the length thereof with respect to the inlet end 30, and with the shallow angle 28b at the leading edge of the diffuser plate. Like the straight and flat surface of the diffuser plate described above, the continuously-curved concave face of diffuser plate 50b can also provide an indeterminate surface 56b against which pulsation waves traveling through the piping system cannot find purchase for a complete reflection. Alternatively, the concave face of diffuser plate 50b can be configured with a surface having modified characteristics to provide, if so desired, a modified reflection.

In yet another representative embodiment 10c illustrated in FIG. 5C, the long axis 52c of the diffuser plate 50c can have a continuous convex curve along the length thereof with respect to the inlet end, and with the shallow angle 28c at the trailing edge of the diffuser plate. The continuously curved convex face of diffuser plate 50 can also provide an indeterminate surface 56c against which pulsation waves traveling through the piping system cannot find purchase for a complete reflection. Alternatively, the convex face of diffuser plate 50c can also be configured with a surface having modified characteristics to provide a modified reflection, if so desired.

Illustrated in FIGS. 6A-6C is another representative embodiment 200 in which a diffuser plate 250 is installed into a flow tube 220 that forms a continuous segment of a piping system 202, and which does not use transition pieces for coupling the pulse diffuser 200 to the upstream and downstream portions of the piping system. As shown, the diffuser plate 250 can have an oval shape which spans the interior cross-section of the piping system 220 having a round cross-sectional shape 224. Furthermore, the diffuser plate can have groupings of diamond-shaped apertures 254 at both ends of the diffuser plate, and with a shortened diffuser plate support 270 that braces a center section of the diffuser plate. It is to be appreciated, however, that other configurations are possible, including the variations in the length of the diffuser plate and the angle between the long axis of the diffuser plate and the axis of the piping system as describe above, as well as differences in the size, shape, and grouping of the apertures formed through the thickness of the diffuser plate.

Both the pulse diffuser 100 depicted in FIGS. 2A-2C and the pulse diffuser 200 depicted in FIGS. 6A-6C could have broad application in the wide variety of process industries and fluid piping systems which use round piping or tubing to convey pressurized fluids, whether gases or liquids, from one point to another. For instance such applications can include but are not limited to: petroleum processing; chemical processing; natural gas and liquids processing; power plant systems; industrial heat transfer and cooling systems; propulsion systems; paper processing; oil, gasoline, natural gas and water pipeline systems and their compression and pumping stations; commercial, municipal and residential HVAC systems; commercial, municipal and residential water and sewage systems; and vehicular exhaust systems, as well as combinations of the above. In some circumstances the pulse diffuser could be integrated directly in the piping, exhaust or fluid handling system during initial manufacture, and in others a pre-existing piping segment or spool piece can be removed and replaced with a piping segment or spool piece having the diffuser plate. The piping segment or spool piece may or may not employ transition pieces.

It yet another representative embodiment illustrated in FIGS. 7A-7C, the pulse diffuser 300 can include a diffuser plate 350 having a width dimension 364 that is substantially greater than the height 326 of the flow tube 320, and which can be used to span the interior cross-section of a flow tube 320 that is substantially wider than it is tall. If desired, the diffuser plate can be supported by multiple diffuser plate supports 370 to ensure that the diffuser plate does not buckle or sag due to the pressure loads created across the broad surface 356 during operation. Alternatively, the pulse diffuser can include a diffuser plate having a width dimension that is substantially less than the height of the flow tube, which can be used to span the interior cross-section of a narrow flow tube that is substantially taller than it is wide (not shown).

One application for the embodiment 300 of the present invention can be the flattened exhaust system of a racing car used in racing circuits such as NASCAR, in which the height of the exhaust tube is minimized to increase the clearance between the bottom of the tubing and the road surface.

Figure 8:
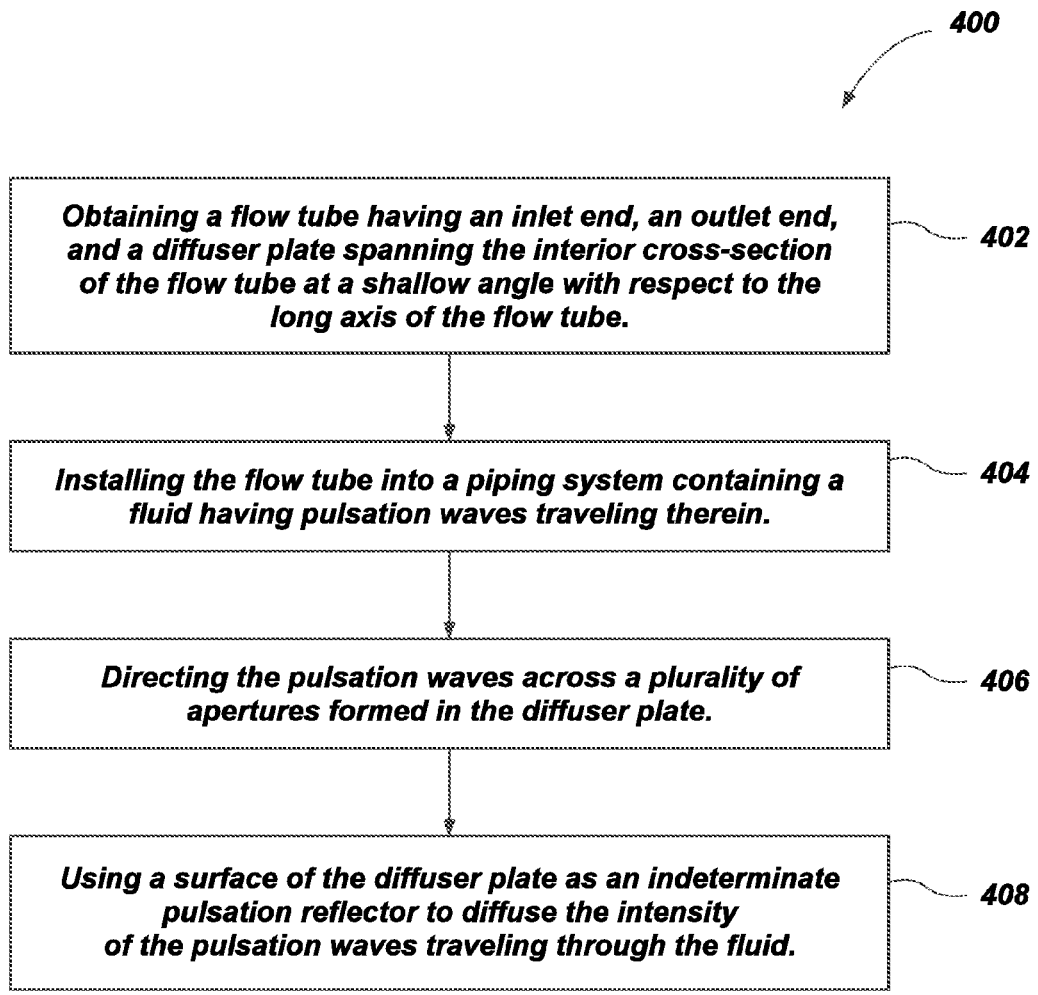
FIG. 8 is a flowchart depicting a method of diffusing the intensity of pulsation waves in a piping system, in accordance with another representative embodiment of the present invention.

Illustrated in FIG. 8 is a flowchart depicting a method 400 of diffusing the intensity of pulsation waves in a piping system, in accordance with another representative embodiment of the present invention. The method includes obtaining 402 a flow tube having an inlet end, an outlet end and a diffuser plate spanning the interior cross-section of the flow tube at a shallow angle with respect to a long axis of the flow tube. The method also includes installing 404 the flow tube into a piping system containing a fluid having pulsation waves passing therethrough. The method further includes directing 406 the pulsation waves across a plurality of apertures formed in the diffuser plate, and using 408 the surface of the diffuser plate as an indeterminate pulsation reflector to diffuse the intensity of the pulsation waves passing through the fluid.

The foregoing detailed description describes the invention with reference to specific representative embodiments. However, it will be appreciated that various modifications and changes can be made without departing from the scope of the present invention as set forth in the appended claims. The detailed description and accompanying drawings are to be regarded as illustrative, rather than restrictive, and any such modifications or changes are intended to fall within the scope of the present invention as described and set forth herein.

More specifically, while illustrative representative embodiments of the invention have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, any steps recited in any method or process claims, furthermore, may be executed in any order and are not limited to the order presented in the claims. The term "preferably" is also non-exclusive where it is intended to mean "preferably, but not limited to." Accordingly, the scope of the invention should be determined solely by the appended claims and their legal equivalents, rather than by the descriptions and examples given above.

What is claimed and desired to be secured by Letters Patent is:

1. An anti-resonant pulsation diffuser comprising:
   an elongate flow tube having an interior cross-section surrounding a long axis, an inlet end aligned with the long axis for receiving a fluid flow and an outlet end for discharging the fluid flow;
   a diffuser plate spanning the entire interior cross-section to separate the flow tube into an inlet chamber and an outlet chamber, the diffuser plate having a plurality of apertures formed therein for directing the fluid flow from the inlet chamber to the outlet chamber; and
   wherein the diffuser plate is longitudinally orientated at a shallow angle with respect to the long axis of the flow tube to provide a substantially smooth indeterminate pulsation reflective surface spanning the entire cross-section directly in line with the inlet, with the inlet chamber gradually decreasing in cross-sectional area and the outlet chamber gradually increasing in cross-sectional area across the length of the flow tube.

2. The pulsation diffuser of claim 1, wherein a length of the diffuser plate is at least about three times of a height of the interior cross-section of the flow tube, and the shallow angle is less than twenty degrees.

3. The pulsation diffuser of claim 1, wherein a length of the diffuser plate ranges from at least about five times to about ten times of a height of the interior cross-section of the flow tube, and the shallow angle ranges from about twelve degrees to about five degrees.

4. The pulsation diffuser of claim 1, wherein a long axis of the diffuser plate is straight along a length thereof.

5. The pulsation diffuser of claim 1, with a long axis of the diffuser plate having a concave curve along a length thereof with respect to the inlet end, and with the shallow angle at the leading edge of the diffuser plate.

6. The pulsation diffuser of claim 1, with a long axis of the diffuser plate having a convex curve along a length thereof with respect to the inlet end, and with the shallow angle at the trailing edge of the diffuser plate.

7. The pulsation diffuser of claim 1, wherein the interior cross-section of the flow tube is rectangular and a perimeter of the diffuser plate has a rectangular shape.

8. The pulsation diffuser of claim 1, wherein the interior cross-section of the flow tube is round and a perimeter of the diffuser plate has an elliptical shape.

9. The pulsation diffuser of claim 1, further comprising a brace between the diffuser plate and a sidewall of the flow tube for supporting the diffuser plate.

10. The pulsation diffuser of claim 9, wherein the brace is positioned against the outlet chamber side of the diffuser plate.

11. The pulsation diffuser of claim 1, wherein a total area of the plurality of apertures is greater than an area of the interior cross-section of the flow tube, to reduce a head loss across the diffuser plate.

12. The pulsation diffuser of claim 1, wherein a shape of the plurality of apertures is selected from the group consisting of triangular, square, rectangular, diamond, polygonal, round, slotted, slotted with rounded ends, oblong, hemispherical, pie and NACA duct opening shapes, and combinations thereof.

13. The pulsation diffuser of claim 1, wherein the flow tube comprises a continuous section of a piping system having the diffuser plate positioned therein.

14. The pulsation diffuser of claim 1, further comprising an inlet transition piece connecting the inlet end to an upstream piping system and an outlet transition piece connecting the outlet end to a downstream piping system.

15. The pulsation diffuser of claim 14, wherein an interior cross-sectional area of the flow tube is different from an interior cross-section area of the upstream piping system or the downstream piping system.

16. A method for diffusing the intensity of pulsation waves in a piping system, comprising:
    obtaining a flow tube having an inlet end, an outlet end, and a substantially smooth diffuser plate spanning the entire interior cross-section of the flow tube at a shallow angle with respect to a long axis of the flow tube and being directly in line with the inlet;
    installing the flow tube into a piping system containing a fluid having pulsation waves traveling therein;
    directing the pulsation waves across a plurality of apertures formed in the diffuser plate; and
    using a surface of the diffuser plate as an indeterminate pulsation reflector to diffuse the intensity of the pulsation waves traveling through the fluid.

17. The method of claim 16, wherein a length of the diffuser plate ranges from at least about five times to about ten times of a height of the interior cross-section of the flow tube, and the shallow angle ranges from about twelve degrees to about five degrees.

18. The method of claim 16, wherein the long axis of the diffuser plate is straight along a length thereof.

19. The method of claim 16, wherein the long axis of the diffuser plate has a concave curve along a length thereof with respect to the inlet end, and with the shallow angle at the leading edge of the diffuser plate.

20. The method of claim 16, wherein the long axis of the diffuser plate has a convex curve along a length thereof with respect to the inlet end, and with the shallow angle at the trailing edge of the diffuser plate.

21. The method of claim 16, wherein a total area of the plurality of apertures is greater than an area of the interior cross-section of the flow tube, to reduce a head loss across the diffuser plate.

22. The method of claim 16, wherein a shape of the plurality of apertures is selected from the group consisting of triangular, square, rectangular, diamond, polygonal, round, slotted, slotted with rounded ends, oblong, hemispherical, pie and NACA duct opening shapes, and combinations thereof.

* * * * *